J. R. BROWN AND G. H. BOLUS.
CATENARY SUSPENSION SYSTEM FOR ELECTRIC RAILWAYS.
APPLICATION FILED SEPT. 12, 1917.

1,336,503. Patented Apr. 13, 1920.

Witness
Harry Wilkinson

Inventor
JOHN ROWLAND BROWN
GLENN H. BOLUS

Attorney

UNITED STATES PATENT OFFICE.

JOHN ROWLAND BROWN AND GLENN H. BOLUS, OF MANSFIELD, OHIO, ASSIGNORS TO THE OHIO BRASS COMPANY, OF MANSFIELD, OHIO, A CORPORATION OF NEW JERSEY.

CATENARY SUSPENSION SYSTEM FOR ELECTRIC RAILWAYS.

1,336,503.      Specification of Letters Patent.      Patented Apr. 13, 1920.

Application filed September 12, 1917. Serial No. 190,898.

*To all whom it may concern:*

Be it known that we, JOHN ROWLAND BROWN and GLENN H. BOLUS, citizens of the United States, residing at Mansfield, in the county of Richland and State of Ohio, have invented certain new and useful Improvements in Catenary Suspension Systems for Electric Railways, of which the following is a specification.

Our invention relates to improvements in a catenary suspension system for electric railways, and includes the use of the usual slack messenger cable and tensioned trolley wire, and relates particularly to the means for suspending the trolley wire from the messenger cable.

The object of our invention is to provide, in a catenary suspension system, means for suspending the trolley wire which will allow the freedom of movement necessary for rendering the system flexible, and which will be simple and durable in construction, easy to install and effective and efficient in operation.

A further object of the invention is to provide in a construction of catenary suspension for trolley wires, means for efficiently maintaining the trolley wire in true and proper alinement for the operation of electric cars at high speeds.

Another object of the invention is to provide means for suspending trolley wires wherein danger to pedestrians through the breaking or falling of the trolley wire carrying live current is reduced to a minimum.

Another object of the invention is to provide flexible means for suspending trolley wires whereby upward movement thereof may proceed under uniform conditions and the trolley encounter no rigid suspension points or so called "hard spots" when operating in contact therewith.

A further object of the invention is to provide, in a flexible construction of catenary suspension for trolley wires, adjustable means whereby the trolley wire can be raised or lowered as may be desired.

To the attainment of these ends and other new and useful objects as will appear, the invention consists, substantially, in the construction, combination, location, and relative arrangement of parts, as will be more fully hereinafter set forth, and shown in the accompanying drawing, in which:—

Figure 1:
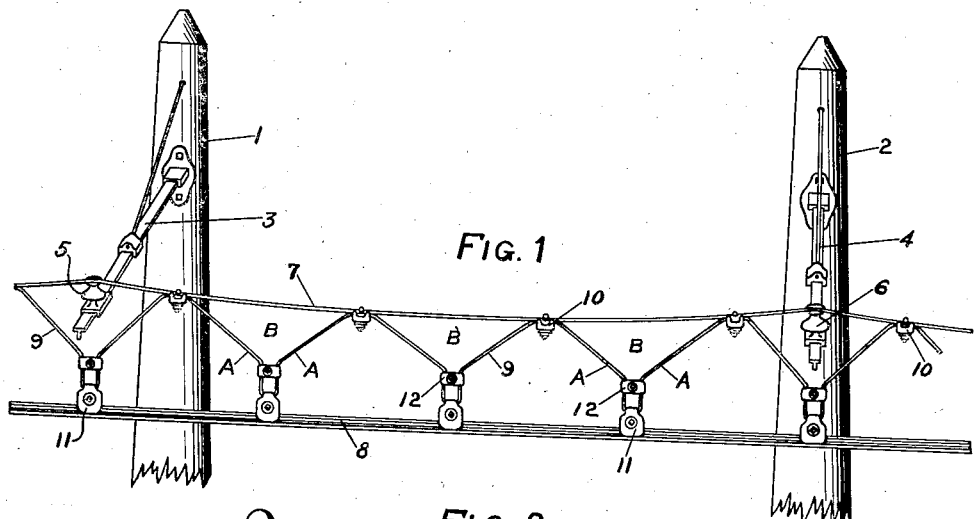
Figure 1 is a view in side elevation of a construction of catenary suspension for trolley wires embodying the principles of our invention.

In the use of electric currents of high voltage for the operation of electric cars, at high speeds, it is desirable to support the trolley wire at frequent and short intervals in order to maintain the trolley wire with as few dips or sags as possible, thereby producing a more nearly straight condition of the trolley wire. This is best attained by suspending the trolley wire from the messenger cable, in the so-called catenary system, by means of a "lacing" wire or cable interposed between the trolley wire and the messenger cable preferably in "zig zag" continuity being attached by suitable clips at its upper bights to the messenger cable and by means of suitable clamps to the trolley wire. The use of the wire or cable for suspending the trolley wire is desirable because of the lessened and more uniform resistance at the suspension points whereby a flexible condition is attained providing for the temporary elevation of the trolley wire to accommodate the "wave motion" caused by the upward thrust of the traveling conductor. While the use of the continuous wire or cable for suspending the trolley wire from the messenger cable has been suggested, the construction has not been shown to overcome an inherent difficulty both in adjusting and readjusting the relative depths of the suspension loops with respect to the catenary curves of the messenger cable, which may vary by reason of temperature, stretching, or other more or less permanent conditions.

Our invention obviates this difficulty and provides an improved catenary construction by which the trolley wire is adjustably suspended from a messenger cable, providing a yielding and uniform elastic resistance for the upward thrust of the traveling conductor.

Referring to the drawings in which similar reference characters indicate like parts in the different views, reference numerals (1) and (2) designate the upper portions of two posts of an electric railway provided with arms (3) and (4) having insulators (5) and (6), secured adjacent the ends thereof; (7) designates a messenger cable supported upon and hanging in catenary curves between the insulators (5) and (6) and similar supports along the line of the railway. The trolley wire (8) is suspended from the messenger cable (7) by means of a preferably continuous cable (9), arranged in zig zag fashion as a "lacing" between the two, held by suitable clip (10), at its upper bights to the messenger cable above and suspending the trolley wire below at its lower bights by means of clamps (11), which when clamped in position tightly grip the two, preventing relative movement thereof.

The primary object of our invention is to provide adjustable means for maintaining the trolley wire at a uniform elevation above the track-way. This we attain by tying together or connecting the divergent suspending portions A, of the cable (9), by means of suitable clips 12, adjustably mounted, which when vertically moved affect the depths of the loops B in a manner as to be increased or decreased; upward movement of the clips decreasing the depths of the loops, and inversely with respect to the opposite movement thereof. Thus it will be noted from the foregoing description and by referring to Fig. 2 that the trolley wire can be easily raised or lowered for adjusting or readjusting the "level" of same.

Figures 2, 3, 4:
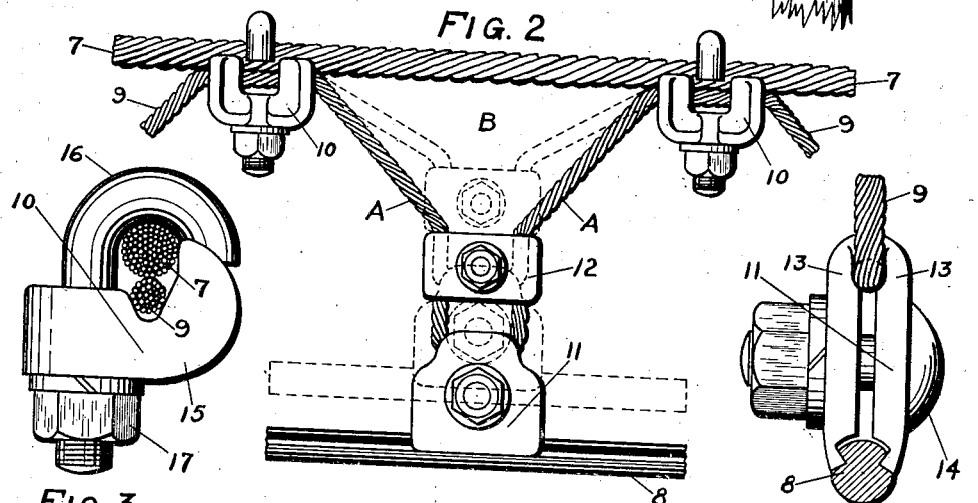
Fig. 2 is an enlarged view of a portion of Fig. 1, showing the trolley wire adjustably suspended, with two positions indicated.
Fig. 3 is a side view of the messenger clip.
Fig. 4 is a side view of the trolley clamp.

The trolley clamp (11)—(referring to Fig. 4), may be of any suitable construction and comprises as shown, a pair of clamping jaws (13) adapted to be drawn together by means of the bolt (14) and which, when in clamped relation tightly grip the trolley wire (8) and the cable (9). As shown in Fig. 3, the messenger clips (10) may comprise a grooved jaw (15), and a hook bolt (16), adapted to be drawn together or clamped in position by means of the nut (17). Likewise the adjustable clips (12) may be constructed as shown in Fig. 6, comprising a pair of jaws (18), having grooves (19) adapted to engage the cable, and a bolt (20) by means of which the jaws are clamped in position.

It will be understood that the invention contemplates the use of any suitable clamps or clips for suspending or adjusting the trolley wire, and that the forms herein shown and described have been selected merely for the purpose of illustrating the application of our invention.

Attention is called to the fact also, that our invention while shown in the drawings applied in a vertical direction as would be the case on tangent track or in a straight line condition, it is equally adaptable to be applied in pull-off positions as would be the case around curves.

Figures 5, 6, 7:
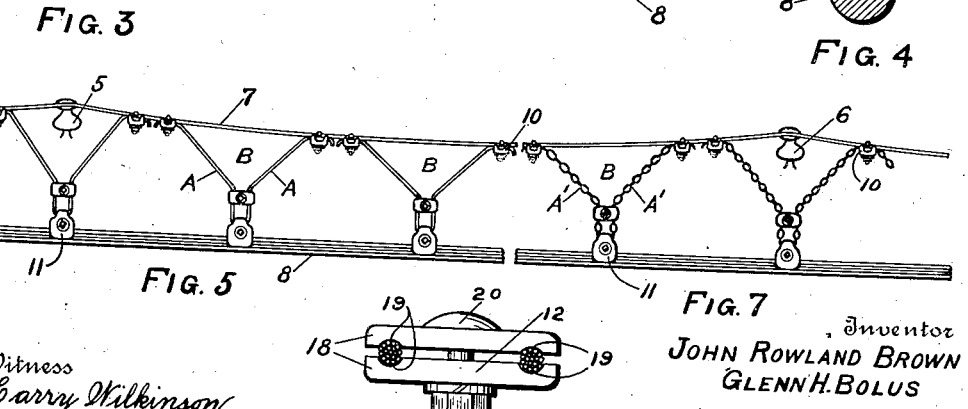
Fig. 5 shows a slightly modified construction of the arrangement shown in Figs. 1 and 2.
Fig. 6 is a top view of the messenger clip.
Fig. 7 shows another slightly modified form of the invention.

Fig. 7 discloses a slightly modified construction wherein independent loops or hangers are formed of short lengths of cable, instead of the continuous "lacing" shown in Figs. 1 and 2, two messenger clips being required for each hanger.

The use of a chain A' as a suspending member interposed between the messenger cable and the trolley wire is shown in Fig. 7 and which it will be understood can be used as a substitute for the cable shown in the other views.

It will be understood that modifications in the arrangements of the parts may be affected without departing from the spirit and scope of our invention.

What we claim is:

1. A hanger for electric lines comprising flexible divergent portions, and adjustable means slidably secured to and connecting said portions at points intermediate their ends, said means operating to vary the effective length of the hanger when positioned from one point to another by drawing the divergent portions together at various points, as described.

2. A hanger for electric railways consisting of a flexible member having divergent portions and adapted to be secured at its upper extremity to a messenger cable and at its lower extremity to a trolley wire, and an adjusting device slidably secured to and connecting the divergent portions of the hanger at points intermediate its upper and lower extremities for varying the effective length of the hanger by pulling toward each other the divergent portions at various points, said device comprising clamping jaws to engage the hanger and means for adjusting the jaws in position.

3. In a system of catenary suspension for trolley wires, a messenger cable, a trolley wire, a suspending member formed up out of flexible material interposed between the cable and wire and comprising divergent portions, means for securing the member directly to the messenger cable, means for removably securing the member to the trolley wire, and means for raising or lowering the trolley wire with respect to the messenger cable, said means consisting of an adjustable device secured to and connecting the divergent portions of said member at points intermediate both of said securing means and operating by vertical movement thereof to vary the effective length of the member by pulling said divergent portions toward each other at various points, substantially as and for the purpose set forth.

4. In a catenary suspension system for electric railways a messenger cable, a trolley wire, a substantially continuous flexible member interposed as the sole supporting element between the cable and trolley wire arranged in zig-zag continuity forming divergent portions, clips fixedly securing the member to the messenger cable, clamps securing the trolley wire to the member, and an adjusting device slidably engaging a plurality of said divergent portions at points intermediate said clips and clamps for varying the space between the trolley wire and the messenger cable, substantially as and for the purpose set forth.

In testimony whereof we affix our signatures.

JOHN ROWLAND BROWN.
GLENN H. BOLUS.